(12) United States Patent
Choi et al.

(10) Patent No.: US 12,000,927 B2
(45) Date of Patent: Jun. 4, 2024

(54) VEHICLE CONTROL SYSTEM FOR DETECTING OBJECT AND METHOD THEREOF

(71) Applicant: HYUNDAI MOBIS CO., LTD., Seoul (KR)

(72) Inventors: Won Jong Choi, Yongin-si (KR); Seok Hyun Kang, Yongin-si (KR); Young Hoon Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 218 days.

(21) Appl. No.: 17/382,991

(22) Filed: Jul. 22, 2021

(65) Prior Publication Data

US 2022/0357443 A1     Nov. 10, 2022

(30) Foreign Application Priority Data

May 7, 2021    (KR) ........................ 10-2021-0059538

(51) Int. Cl.
| | |
|---|---|
| *G01S 13/931* | (2020.01) |
| *G01S 7/41* | (2006.01) |
| *G01S 13/44* | (2006.01) |
| *G01S 13/58* | (2006.01) |
| *G01S 13/68* | (2006.01) |

(52) U.S. Cl.
CPC .............. *G01S 13/931* (2013.01); *G01S 7/411* (2013.01); *G01S 13/4418* (2013.01); *G01S 13/4454* (2013.01); *G01S 13/584* (2013.01); *G01S 13/68* (2013.01)

(58) Field of Classification Search
CPC .... G01S 13/931; G01S 7/411; G01S 13/4418; G01S 13/4454; G01S 13/584; G01S 13/68
USPC .......................................................... 342/70
See application file for complete search history.

(56) References Cited

U.S. PATENT DOCUMENTS

| | | | | |
|---|---|---|---|---|
| 5,710,565 | A * | 1/1998 | Shirai ..................... | G05D 1/024 342/72 |
| 8,170,725 | B2 * | 5/2012 | Chin ...................... | B62D 6/007 701/1 |
| 9,462,607 | B2 * | 10/2016 | Ma ....................... | H04W 74/002 |
| 9,523,760 | B1 * | 12/2016 | Kravets ................. | G01S 5/0273 |
| 9,743,294 | B1 * | 8/2017 | Omer ..................... | G01S 13/56 |

(Continued)

FOREIGN PATENT DOCUMENTS

| | | | | |
|---|---|---|---|---|
| DE | | 19614061 A1 * | 10/1996 | ......... B60K 31/0008 |
| DE | 10 2011 015 935 A1 | | 10/2012 | |

(Continued)

OTHER PUBLICATIONS

Office Action issued in corresponding Korean Patent Application No. 10-2021-0059538 dated May 16, 2022.

(Continued)

*Primary Examiner* — Nuzhat Pervin
(74) *Attorney, Agent, or Firm* — MORGAN, LEWIS & BOCKIUS LLP

(57) ABSTRACT

A vehicle control system may include a controller that detects an object outside a vehicle, calculates an angle based on a ratio of a relative speed between the object and the vehicle to a speed of the vehicle, and updates a phase curve reflecting a phase distortion of an input signal based on the calculated angle.

12 Claims, 15 Drawing Sheets

(56) References Cited

U.S. PATENT DOCUMENTS

| | | | |
|---|---|---|---|
| 9,893,790 B2* | 2/2018 | Moon | H04B 7/0452 |
| 9,912,513 B2* | 3/2018 | Kwon | H04L 27/2665 |
| 9,958,541 B2* | 5/2018 | Kishigami | G01S 13/26 |
| 10,045,369 B2* | 8/2018 | Li | H04W 72/21 |
| 10,051,414 B1* | 8/2018 | Omer | G01S 13/56 |
| 10,516,468 B2* | 12/2019 | Yoon | H04L 5/0048 |
| 10,630,519 B2* | 4/2020 | Lee | H04L 5/0016 |
| 10,962,970 B2* | 3/2021 | Yoneda | F02D 11/10 |
| 11,262,184 B1* | 3/2022 | Millar | G01B 9/02091 |
| 11,543,834 B2* | 1/2023 | Nobukawa | H04W 4/46 |
| 2012/0146788 A1* | 6/2012 | Wilson | G08B 13/187 |
| | | | 340/539.23 |
| 2015/0051794 A1* | 2/2015 | Wei | B62D 15/021 |
| | | | 701/41 |
| 2015/0358995 A1* | 12/2015 | Li | H04W 72/21 |
| | | | 370/329 |
| 2015/0369912 A1* | 12/2015 | Kishigami | G01S 13/34 |
| | | | 342/104 |
| 2015/0382342 A1* | 12/2015 | Seok | H04W 72/21 |
| | | | 370/336 |
| 2016/0066342 A1* | 3/2016 | Ma | H04W 74/04 |
| | | | 370/329 |
| 2016/0087775 A1* | 3/2016 | Hedayat | H04L 5/0055 |
| | | | 370/329 |
| 2016/0105304 A1* | 4/2016 | Kwon | H04W 56/00 |
| | | | 370/338 |
| 2016/0183192 A1* | 6/2016 | Kang | H04M 1/72463 |
| | | | 370/311 |
| 2016/0192351 A1* | 6/2016 | Kwon | H04W 72/21 |
| | | | 370/329 |
| 2016/0315681 A1* | 10/2016 | Moon | H04W 74/0816 |
| 2016/0315796 A1* | 10/2016 | Kwon | H04L 27/2666 |
| 2016/0330714 A1* | 11/2016 | Hedayat | H04L 5/0023 |
| 2016/0330732 A1* | 11/2016 | Moon | H04B 7/0639 |
| 2016/0345349 A1* | 11/2016 | Ferdowsi | H04W 72/1268 |
| 2017/0042484 A1* | 2/2017 | Chong | A61B 5/7221 |
| 2017/0201305 A1* | 7/2017 | Moon | H04W 74/0816 |
| 2018/0031691 A1* | 2/2018 | Kurashige | G01S 13/345 |
| 2018/0220417 A1* | 8/2018 | Matsuo | H04W 72/20 |
| 2018/0288799 A1* | 10/2018 | Min | H04W 74/0808 |
| 2018/0321378 A1* | 11/2018 | Sudhakar | G01S 13/4454 |
| 2019/0109674 A1* | 4/2019 | Hedayat | H04L 5/0007 |
| 2019/0140728 A1* | 5/2019 | Moon | H04B 7/0617 |
| 2019/0146075 A1* | 5/2019 | Kravets | H04B 17/391 |
| | | | 455/67.11 |
| 2019/0238377 A1* | 8/2019 | Lee | H04L 5/0094 |
| 2019/0393618 A1* | 12/2019 | Guthrie | H01Q 3/36 |
| 2020/0018818 A1* | 1/2020 | Jager | G01S 3/48 |
| 2020/0033436 A1* | 1/2020 | Videtich | H01Q 11/08 |
| 2020/0213172 A1* | 7/2020 | Lee | H04W 74/085 |
| 2020/0373675 A1* | 11/2020 | Ahmed | H01Q 1/38 |
| 2021/0031762 A1* | 2/2021 | Matsunaga | B60W 50/14 |
| 2021/0333358 A1* | 10/2021 | Park | G01S 13/86 |
| 2021/0389448 A1* | 12/2021 | Miyaoka | G01S 13/345 |
| 2022/0120853 A1* | 4/2022 | Lee | G01S 13/32 |
| 2022/0194416 A1* | 6/2022 | Oniwa | B60W 60/001 |
| 2023/0125522 A1* | 4/2023 | Kibardin | G06N 3/084 |
| | | | 706/15 |

FOREIGN PATENT DOCUMENTS

| | | | | |
|---|---|---|---|---|
| DE | 102011015935 A1 | * | 10/2012 | G01S 13/4454 |
| EP | 1562776 B1 | * | 5/2006 | B60K 31/0008 |
| EP | 1562774 B1 | * | 1/2008 | B60K 31/0008 |
| EP | 1562772 B1 | * | 9/2008 | B60K 31/0008 |
| EP | 1562777 B1 | * | 4/2010 | B60K 31/0008 |
| KR | 10-1929681 B1 | | 12/2018 | |
| KR | 10-2020-0028137 A | | 3/2020 | |
| KR | 10-2020-0071498 A | | 6/2020 | |
| KR | 10-2020-0108464 A | | 9/2020 | |
| WO | WO-2004045888 A1 | * | 6/2004 | B60K 31/0008 |
| WO | WO-2004045891 A1 | * | 6/2004 | B60K 31/0008 |
| WO | WO-2004045892 A1 | * | 6/2004 | B60K 31/0008 |
| WO | WO-2004045893 A1 | * | 6/2004 | B60K 31/0008 |
| WO | WO-2012136494 A1 | * | 10/2012 | G01S 13/4454 |
| WO | WO-2019181448 A1 | * | 9/2019 | G01S 13/42 |
| WO | WO-2020105750 A1 | * | 5/2020 | G01S 13/931 |

OTHER PUBLICATIONS

Extended European Search Report issued in corresponding European Application No. 21186723.9 dated Feb. 1, 2022.

Notice of Allowance issued in corresponding Korean Application No. 10-2021-0059538 dated Nov. 25, 2022.

* cited by examiner

VEHICLE CONTROL SYSTEM FOR DETECTING OBJECT AND METHOD THEREOF

CROSS-REFERENCE TO RELATED APPLICATION

This application claims the benefit of priority to Korean Patent Application No. 10-2021-0059538, filed in the Korean Intellectual Property Office on May 7, 2021, the entire contents of which are incorporated herein by reference.

TECHNICAL FIELD

The present disclosure relates to a technique for detecting an object in a vehicle control system.

BACKGROUND

A vehicle control system mounted on a vehicle may detect an object in the front, side, rear, or side rear using a sensor. For example, the vehicle control system may calculate the angle between the vehicle and the object through a phase mono-pulse algorithm used in radar. The phase mono-pulse algorithm estimates the incident angle (or output angle) of an input signal through the distance between two antennas and the phase difference between the input signals incident to the two antennas. A curve representing the relationship between the phase difference and the output angle may be referred to as a phase curve. Because the phase mono-pulse algorithm has the advantage that angular ambiguity does not occur even from the side, compared to a beamforming scheme, a sensor device (e.g., radar) to which the phase mono-pulse algorithm is applied is mounted on the rear side portion of the vehicle so that it is possible to calculate an angle between the vehicle and the object.

SUMMARY

The present disclosure has been made to solve the above-mentioned problems occurring in the prior art while advantages achieved by the prior art are maintained intact.

In an angle calculation scheme using a phase curve and a phase difference like a phase mono-pulse algorithm, angle ambiguity may be minimized when the phase difference and the output angle of an input signal have a one-to-one correspondence. Therefore, although a sensor should be installed in a position where there is no phase distortion of the signal, when a bumper is mounted on a vehicle, phase distortion is inevitable due to diffuse reflection in the bumper, and a sensor mounting position that minimizes phase distortion or does not exceed the limit of distortion is required.

A sensor mounting location that minimizes phase distortion may vary slightly depending on the vehicle, and it is impossible to find the optimal sensor mounting location by measuring the phase curve of a signal individually for each vehicle in consideration of time and cost. Although it is possible to consider a method of measuring the phase curve of a signal for a few exemplary vehicles and generalizing it to individual vehicles, compared to the manpower and financial consumption incurred in the process of selecting an exemplary vehicle and measuring the phase curve of a signal, it is impossible to accurately reflect the deviation depending on the individual vehicle, so that the efficiency may be reduced.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a vehicle control system may include a controller that detects an object outside a vehicle, calculates an angle based on a ratio of a relative speed between the object and the vehicle to a speed of the vehicle, and updates a phase curve reflecting a phase distortion of an input signal based on the calculated angle.

According to another aspect of the present disclosure, a method of operating a vehicle control system may include detecting an object outside a vehicle, calculating an angle based on a ratio of a relative speed between the object and the vehicle to a speed of the vehicle, and updating a phase curve reflecting a phase distortion of an input signal based on the calculated angle.

BRIEF DESCRIPTION OF THE DRAWINGS

The above and other objects, features and advantages of the present disclosure will be more apparent from the following detailed description taken in conjunction with the accompanying drawings.

With regard to description of drawings, the same or similar elements may be marked by the same or similar reference numerals.

DETAILED DESCRIPTION

Figure 1:
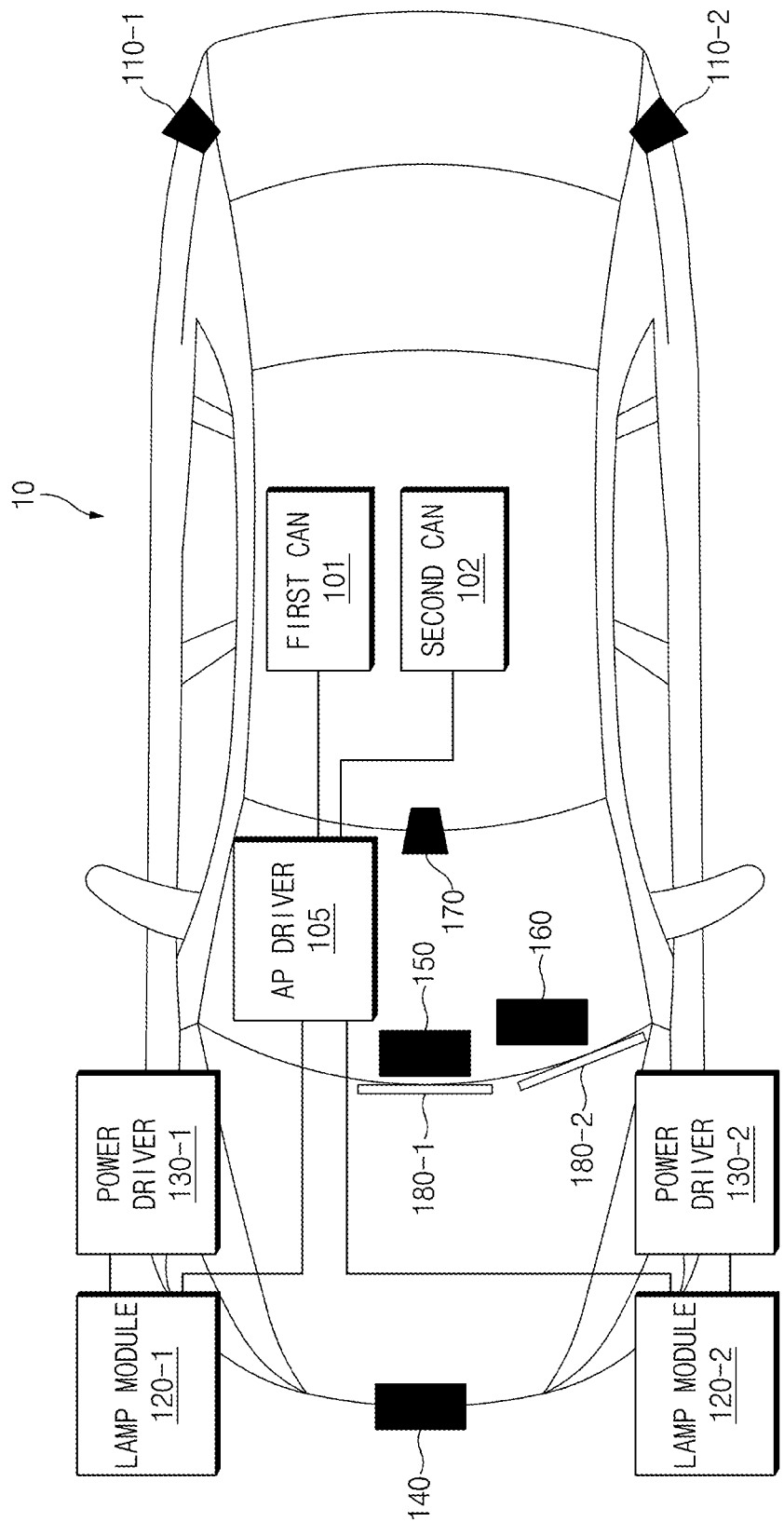
FIG. 1 is a block diagram illustrating a vehicle according to various embodiments.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine. For example, the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store or between two user devices directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component.

In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 is a block diagram of a vehicle according to various embodiments.

A vehicle 10 may include an application processor (AP) driver 105, a first controller area network (CAN) 101, a second CAN 102, rear sensors 110-1 and 110-2, lamp modules 120-1 and 120-2, power drivers 130-1 and 130-2, a radar 140, a navigation system 150, a steering 160, a camera 170, and wipers 180-1 and 180-2.

The AP driver 105 may be, for example, a control device for controlling components in the vehicle 10. The AP driver 105 may be referred to as a processor or an electronic controller unit (ECU). The AP driver 105 may control the components in the vehicle 10 through the first or second CAN 101 or 102. The first CAN 101 and the second CAN 102 may be protocols that the AP driver 105 uses to control the components in the vehicle 10. For example, the AP driver 105 may control at least one of the camera 170, the radar 140, the rear sensors 110-1 and 110-2, and the navigation system 150 through the first CAN 101 to perform the sensing of the vehicle 10 and its function, and may control the steering 160, a brake (not shown) and the speed of the vehicle 10 through the second CAN 102 to control functions related to driving of the vehicle 10. The first CAN 101 may be referred to as a private CAN (P-CAN), and the second CAN 102 may be referred to as a chassis CAN (C-CAN).

The rear sensors 110-1 and 110-2 may be set to detect a blind spot that the driver of the vehicle 10 cannot detect (e.g., the rear side of the vehicle). For example, the rear sensors 110-1 and 110-2 may be radar devices configured to detect an object outside the vehicle 10 by transmitting and receiving a signal in a specified frequency band. The rear sensors 110-1 and 110-2 may be used as blind spot detection (BSD) or blind-spot collision warning (BCW). The number and locations of the rear sensors 110-1 and 110-2 are not limited to the example shown in FIG. 1.

The lamp modules 120-1 and 120-2 may include head lamps irradiating light to the front of the vehicle. According to an embodiment, the lamp module 120-1 may include a digital micro-mirror device (DMD) including a plurality of micro mirrors, such that the vehicle 10 can more precisely control the intensity and direction of light. According to an embodiment, each of the lamp modules 120-1 and 120-2 may be connected to the AP driver 105 through a coaxial cable (e.g., a fakra cable). Each of the power drivers 130-1 and 130-2 may be configured to supply power to the lamp modules 120-1 and 120-2, respectively.

The radar 140 may be configured to detect an object located in front of the vehicle 10. For example, the AP driver

105 may detect the location, speed, or direction of an object (e.g., a pedestrian or an obstacle) by using the radar 140.

The camera 170 may obtain an image of the front of the vehicle 10. The AP driver 105 may detect the location, speed, direction, shape, or size of an object located in front by analyzing the image obtained through the camera 170. In addition to the example shown in FIG. 1, the vehicle 10 may further include at least one camera configured to obtain an image of the rear of the vehicle 10 or a 360-degree space surrounding the vehicle 10. The wipers 180-1 and 180-2 may secure the driver's view by removing rainwater placed on the windshield of the vehicle. In addition to the example shown in FIG. 1, the vehicle 10 may further include at least one wiper configured to remove rainwater placed at the rear of the vehicle 10. In addition, although FIG. 1 shows two wipers 180-1 and 180-2, the vehicle 10 may use one wiper.

Hereinafter, a method of correcting the phase distortion of a signal in an algorithm for calculating the angle between the vehicle 10 and an external object using the rear sensors 110-1 and 110-2 installed on the rear side of the vehicle 10 will be described.

FIGS. 2A to 2D are views illustrating an operation of calculating an angle based on a phase mono-pulse algorithm.

Figure 2A:
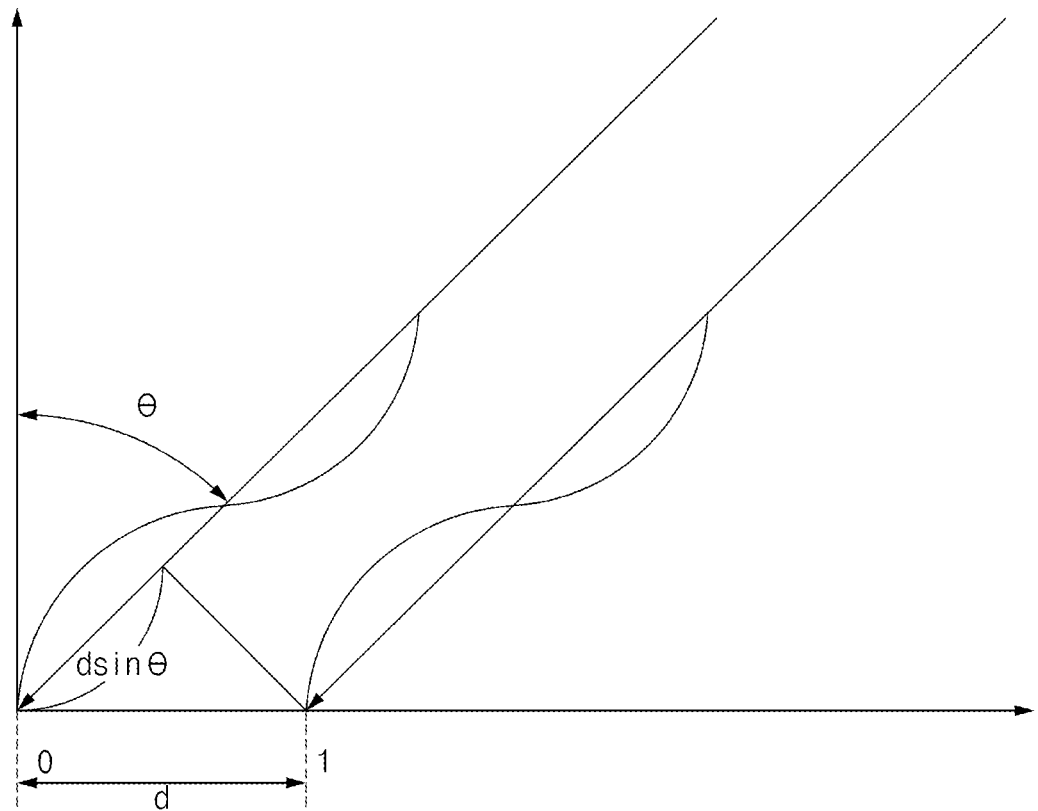
FIGS. 2A to 2D are views illustrating an operation of calculating an angle based on a phase mono-pulse algorithm.

When the distance d between the antennas and the frequency (f=w/2π) of a signal are given, a vehicle control system (e.g., 300 in FIG. 3) included in the vehicle 10 may calculate the angle θ between the vehicle 10 (or the rear sensor) and the external object based on following Equation 1 as shown in FIG. 2A.

$$\theta = \sin^{-1}\left(\frac{w\lambda}{2\pi d}\right)$$ [Equation 1]

Figure 2B:
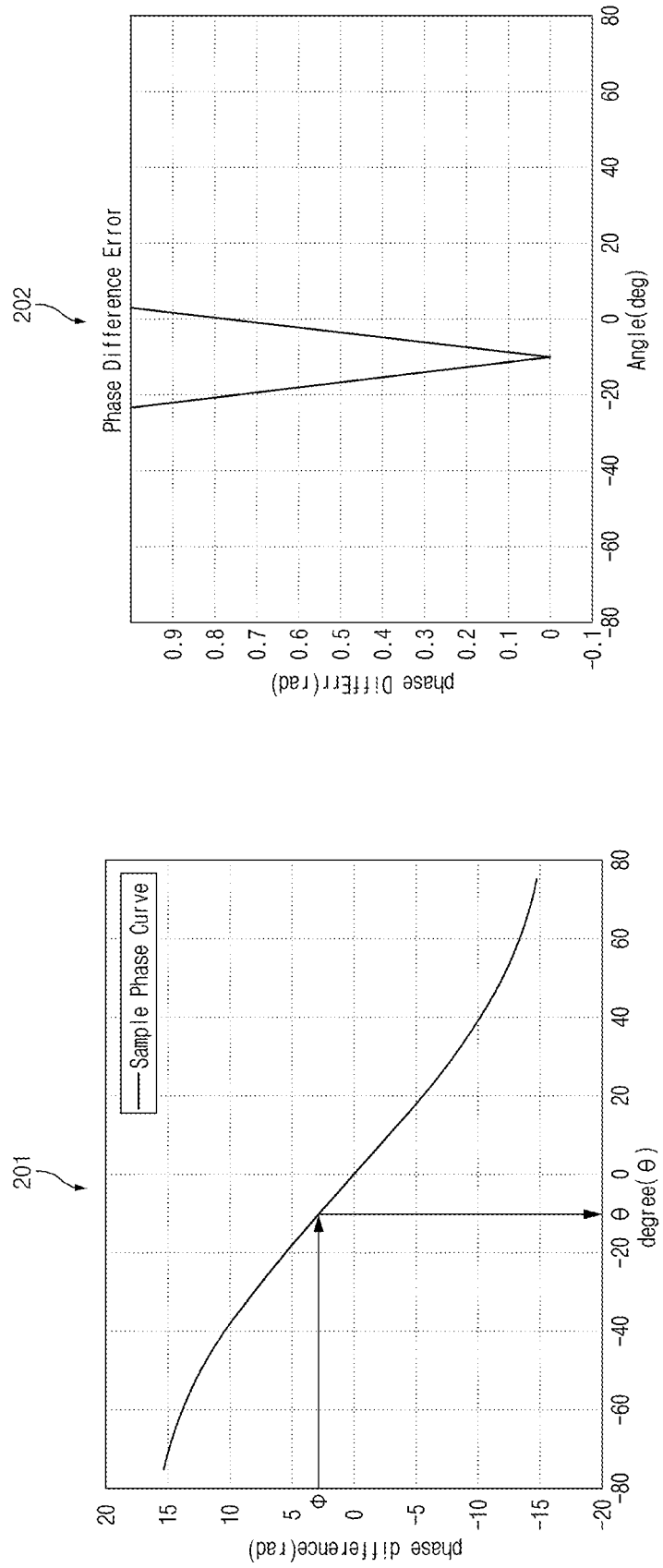
Figure 2C:
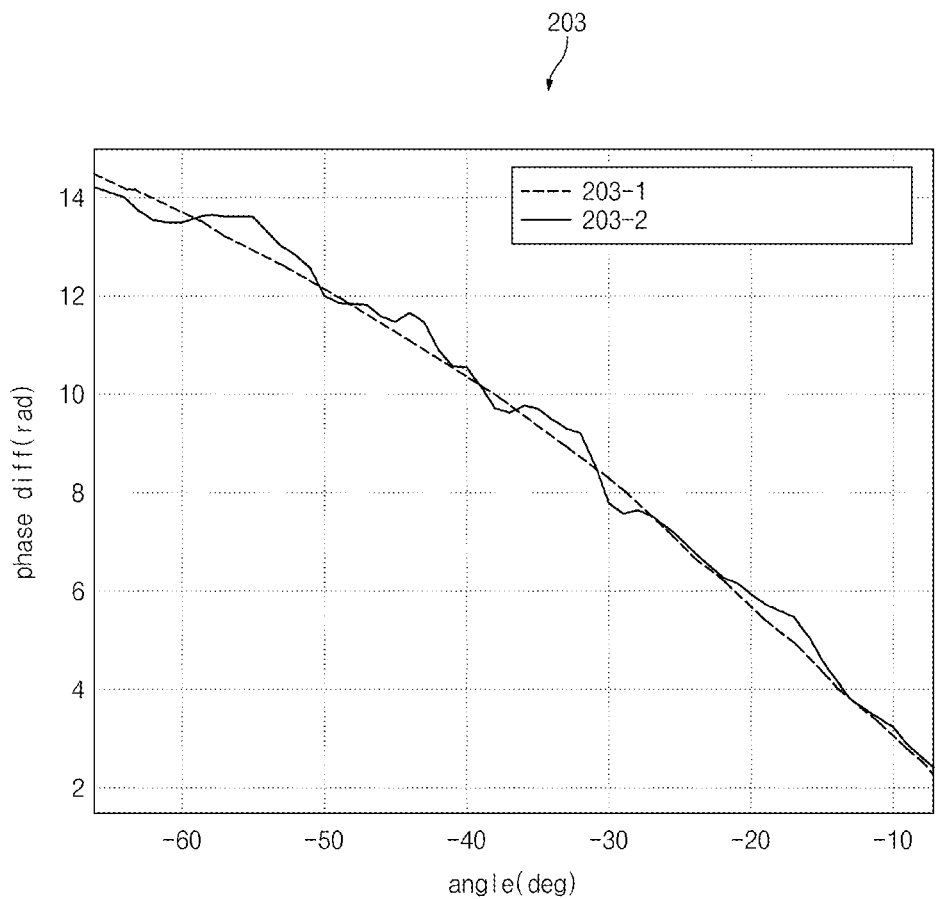
Figure 2D:
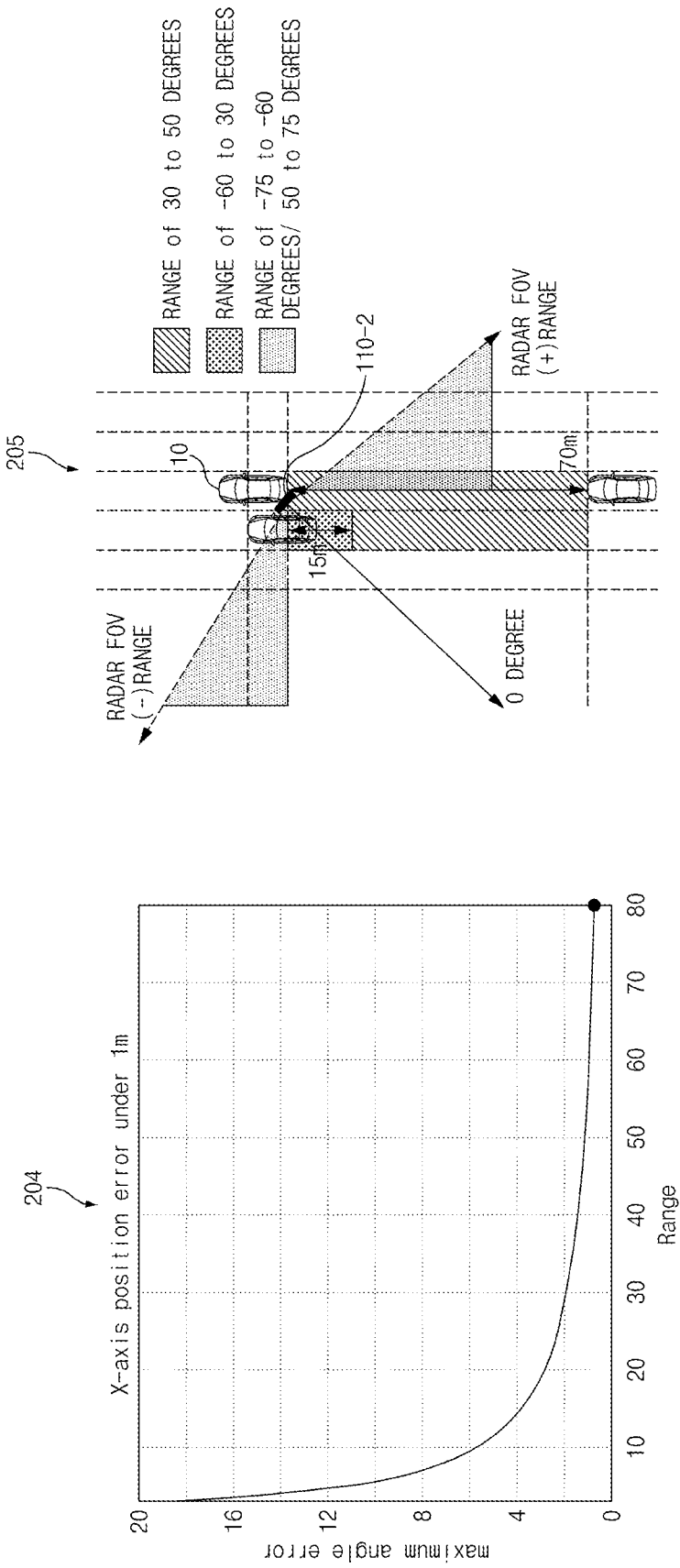

A phase difference corresponding to the angle may be generated corresponding to the distance between the antennas, and the vehicle control system of FIG. 2B may generate a phase curve indicating the phase difference corresponding to the angle as shown in a first graph 201. For example, the vehicle control system may compare the phase difference Φ between signals incident on the two antennas with the phase curve, and calculate the angle θ with the smallest phase difference error as shown in a second graph 202 of FIG. 2B.

In the case of a sensor (e.g., 140) mounted on the front of the vehicle 10, surface treatment may be performed to minimize the signal distortion, but a sensor mounted on the rear of the vehicle 10 (e.g., 110-1 or 110-2) may be disposed inside the bumper, so that distortion may occur in the phase of the signal due to diffused reflection in the bumper. For example, referring to a third graph 203 of FIG. 2C, the phase curve measured in an electromagnetic wave anechoic environment has the same shape as the first phase curve 203-1, whereas a ripple may occur in the phase curve measured after installing the rear bumper of the vehicle 10 as in the second phase curve 203-2. When a ripple occurs, the one-to-one relationship between the phase difference and the output angle is not established, which may lead to angle errors and ambiguity. For convenience of explanation, the algorithm for generating a phase curve (e.g., 203-1) in an electromagnetic wave anechoic environment is a sample phase curve (SPC), and the algorithm for generating a phase curve (e.g., 203-2) after installing the rear bumper may be referred to as an individual phase curve (IPC).

The allowable angular error in angle measurement may be referred to as 'maximum required angular accuracy'. The sensor cannot be mounted at a location in the phase curve where the angle error is out of the maximum required angular accuracy (e.g. 4 degrees). The maximum required angular accuracy may vary depending on the distance between the vehicle 10 and the object. For example, for the lateral position error between the vehicle and the object to be within 1 m, the maximum allowable angle error corresponding to the longitudinal position distance may be expressed as shown in the fourth graph 204 of FIG. 2D. For example, an angular accuracy within 0.8 degrees is required at a distance of 80 m from the longitudinal position, whereas an angular accuracy of within 3.8 degrees may be required at a distance of m from the longitudinal position. In a similar manner to the above, the maximum required angular accuracy may vary depending on the angle range within the field of view (FOV) of the sensor. For example, reference number 205 of FIG. 2D indicates the maximum required angular accuracy for each angle range of the sensor—110-2 mounted on the rear side of the vehicle 10. When it is assumed that angular accuracy within the first angle (e.g., 1 degree) is required in the range of 30 to 50 degrees, angular accuracy within a second angle (e.g., 3 degrees) larger than the first angle may be required in the range of −60 to 30 degrees. In addition, in the range of −75 to −60 degrees and 50 to 75 degrees, angular accuracy within a third angle (e.g., 4 degrees) greater than the second angle may be required.

As described above, although the vehicle control system is required to use the phase curve (IPC) in which the phase distortion due to the bumper of each vehicle is reflected when measuring the angle between the vehicle 10 and the object existing in the rear side of the vehicle 10, it is impossible to measure the IPC after installing the bumper of each individual vehicle in the production process in consideration of time and cost, and the IPC cannot be applied to already produced vehicles. The scheme of measuring and generalizing the IPC of some example vehicles may not accurately reflect the deviation of individual vehicles compared to the manpower and resource consumption that occurs in the process of selecting an exemplary vehicle and measuring the phase curve of a signal, so the efficiency may be reduced. The vehicle control system according to embodiments may generate and correct a phase curve by using a ratio of the relative speed between the vehicle and the object to the speed of the vehicle, thereby increasing the accuracy of angle calculation despite the phase distortion due to the bumper.

Figure 3:
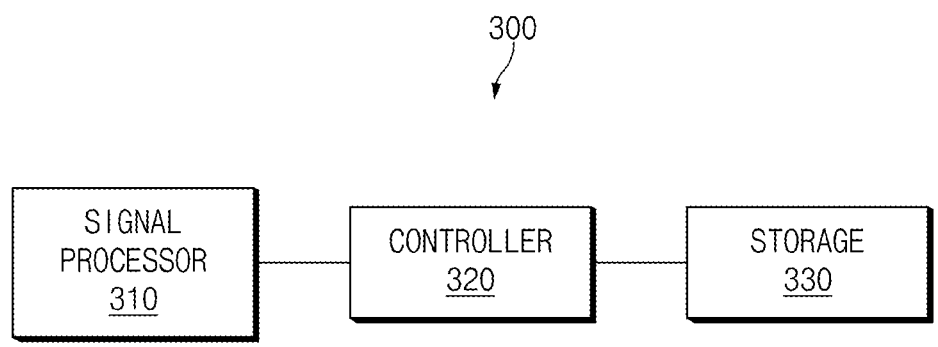
FIG. 3 is a block diagram illustrating a vehicle control system according to various embodiments.

FIG. 3 is a block diagram illustrating a vehicle control system according to various embodiments. Referring to FIG. 3, a vehicle control system 300 may include a signal processor 310, a controller 320, and storage 330.

The signal processor 310 may be configured to transmit and receive a signal in a specified frequency band in order to measure the distance and the angle between the vehicle 10 and an object. For example, the signal processor 310 may be the rear sensors —110-1 and 110-2 of FIG. 1.

The controller 320 may be connected to the signal processor 310 and the storage 330. For example, the controller 320 may be a hardware device such as the AP driver 105 or a processor, or instructions (e.g., a program, an application, or the like) for performing overall operations of the vehicle control system 300. The controller 320 may control at least one of other components (e.g., a hardware or software component) of the vehicle control system 300 and may perform various data processing or operations. According to an embodiment, as at least part of data processing or operation, the controller 320 may store a command or data received from another component (e.g., a sensor) in a volatile memory, process the command or data stored in the volatile memory, and store the result data in a non-volatile memory (e.g., the storage 330). According to an embodiment, the controller 320 may include a main processor (e.g., a central processing unit or an application processor) or an auxiliary processor (e.g., a graphic processing unit, an image signal processor, a sensor hub processor, or a communication processor) that may be operated independently or together with the main processor. For example, when the controller 320 includes a main processor and an auxiliary processor, the auxiliary processor may be configured to use less power than the main processor or to be specialized for a specified function. The coprocessor may be implemented separately from the main processor or with a part of the main processor.

In an embodiment, the controller 320 may detect an object outside the vehicle 10, calculate an angle based on the ratio of the relative speed between the detected object and the vehicle and the speed of the vehicle 10, and generate or update a phase curve in which the phase distortion of an input signal is reflected, based on the calculated angle. In order to calculate the angle, the controller 320 may obtain an object candidate group among the detected objects based on a first condition, calculate the ratio of the relative speed and the speed for each of the object candidate groups and the angle data accordingly, and then, filter angle data based on a second condition. In order to update the phase curve, the controller 320 may generate a phase curve within a specified angular range, calculate an offset of the generated phase curve, and generate a final phase curve through smoothing after compensating the phase curve.

Figure 4:
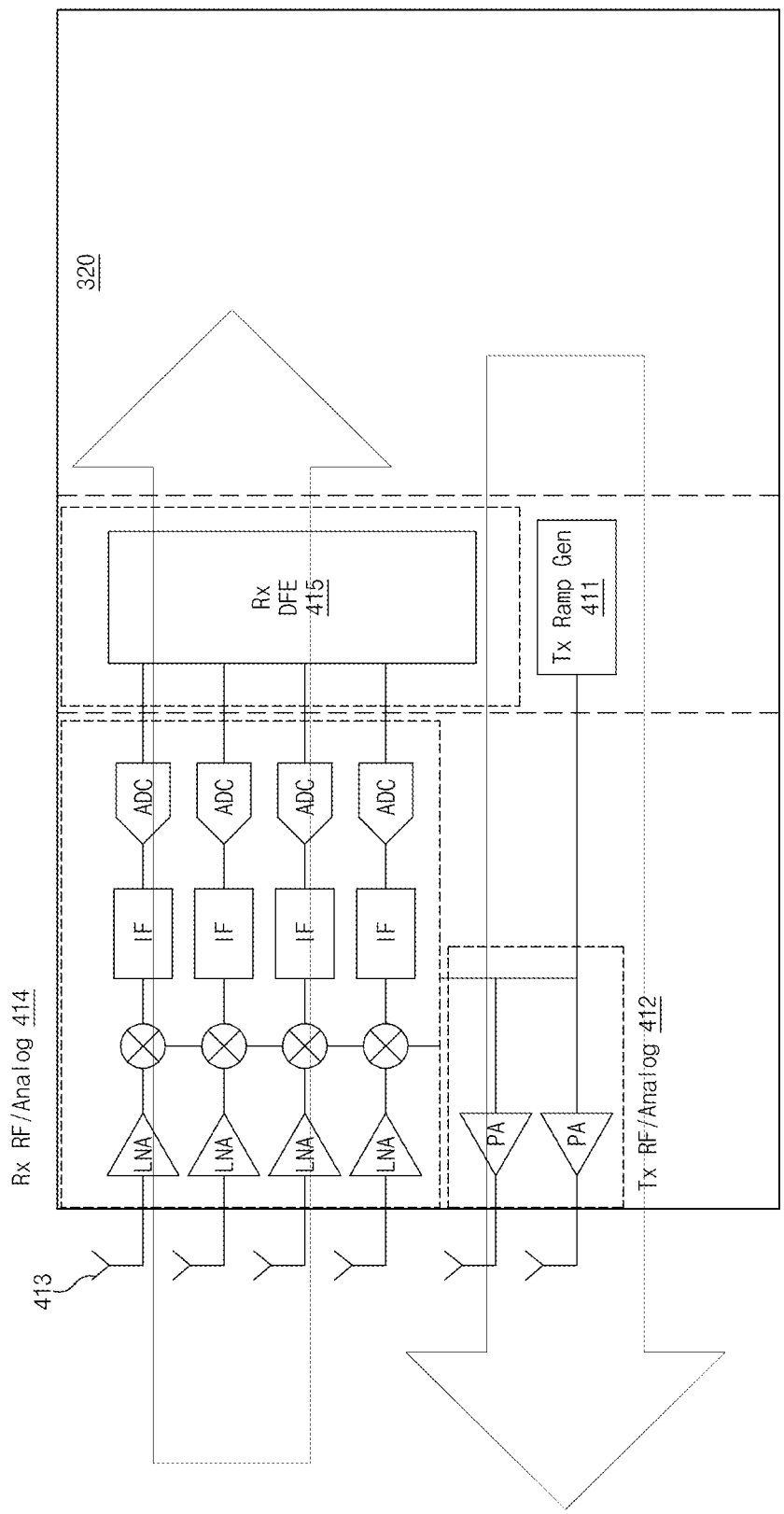
FIG. 4 is a detailed block diagram illustrating a signal processor according to various embodiments.

The storage 330 may store an instruction for controlling the vehicle control system 300, a control instruction code, control data, or user data. For example, the storage 330 may include at least one of an application program, an operating system (OS), middleware, and a device driver. The storage 330 may include one or more of a volatile memory and a non-volatile memory. The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), and the like. The nonvolatile memory may include a read only memory (ROM), a programmable ROM (PROM), an electrically programmable ROM (EPROM), an electrically erasable programmable ROM (EEPROM), a flash memory, and the like. The storage 330 may further include a nonvolatile medium such as a hard disk drive (HDD), a solid state disk (SSD), an embedded multi-media card (eMMC), and a universal flash storage (UFS). FIG. 4 is a detailed block diagram illustrating a signal processor according to various embodiments.

Referring to FIG. 4, the signal processor 310 may a transmission (Tx) ramp generator 411, a transmission radio frequency (RF) analog end 412, at least one antenna 413, a reception (Rx) RF analog end 414, and a reception digital front end (DFE) 415. The transmission ramp generator 411 may convert a signal for detecting an object into a specified frequency. The transmission analog end 412 may transmit a signal through at least one antenna 413 by processing a signal in a specified frequency band. For example, the transmission analog end 412 may include a power amplifier (PA). The reception RF analog end 414 may process a signal received through the at least one antenna 413. For example, the reception RF analog end 414 may include a low noise amplifier (LNA), a mixer, an intermediate frequency (IF) converter, and an analog-digital converter (ADC). The reception DFE 415 may convert the received signal into a digital signal and transmit the digital signal to the controller 320. The controller 320 may calculate an angle through a signal received from the reception DFE 415 and control the operation of the vehicle control system 300 for correcting a phase curve.

Figure 5:
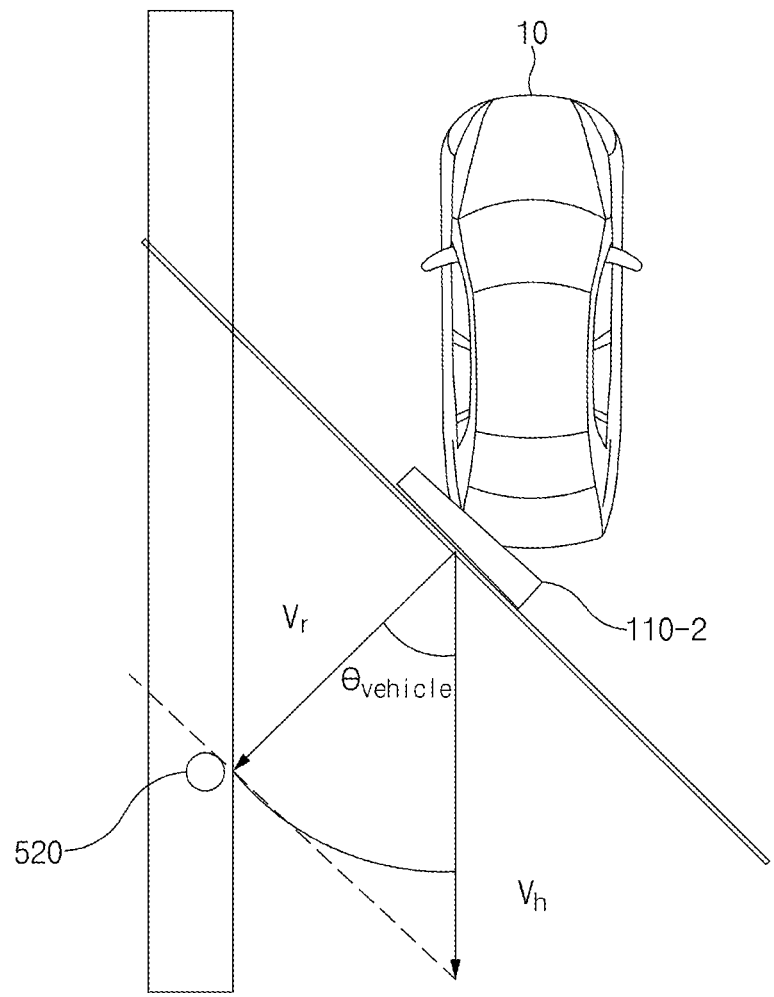
FIGS. 5 to 7 are views illustrating an operation of updating a phase curve based on a relative speed according to various embodiments.
Figure 6:
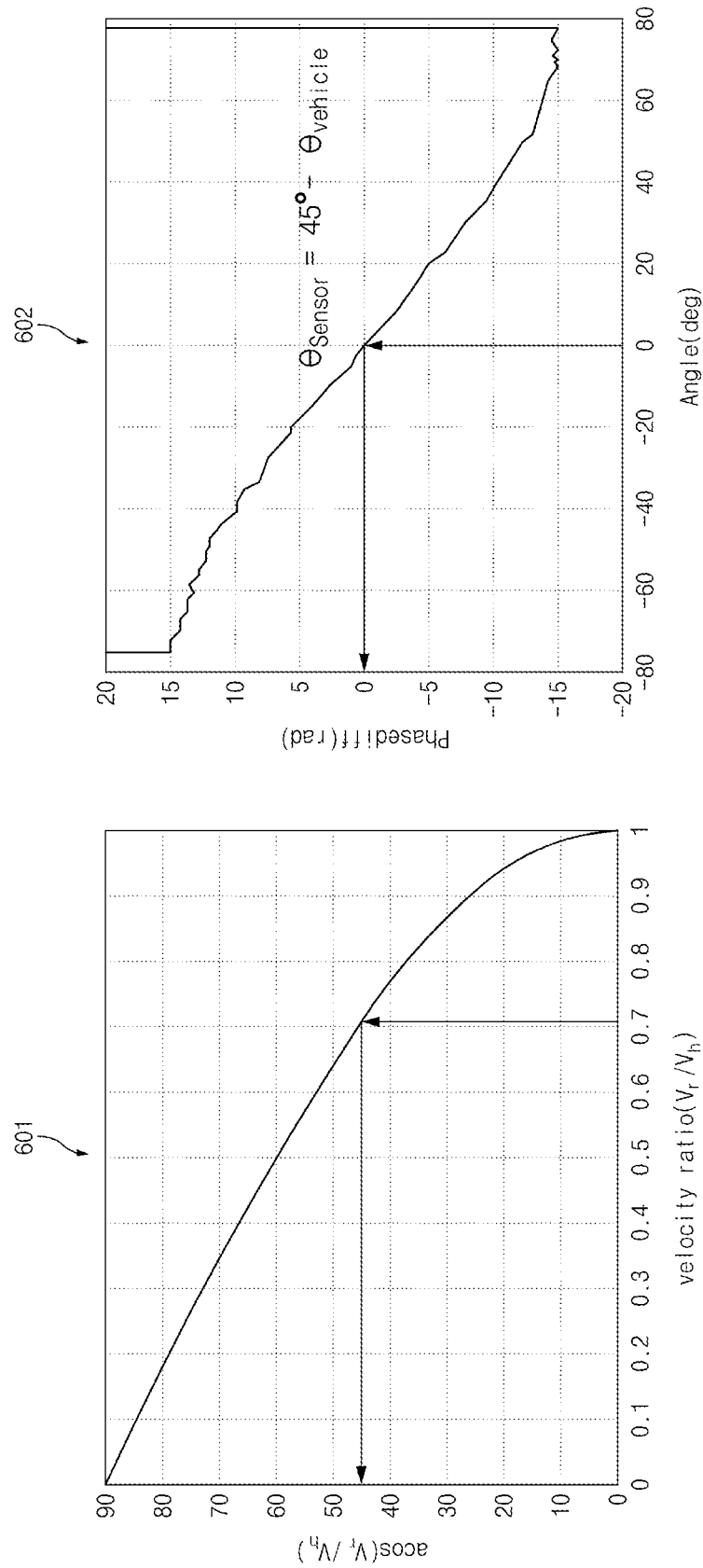
Figure 7:
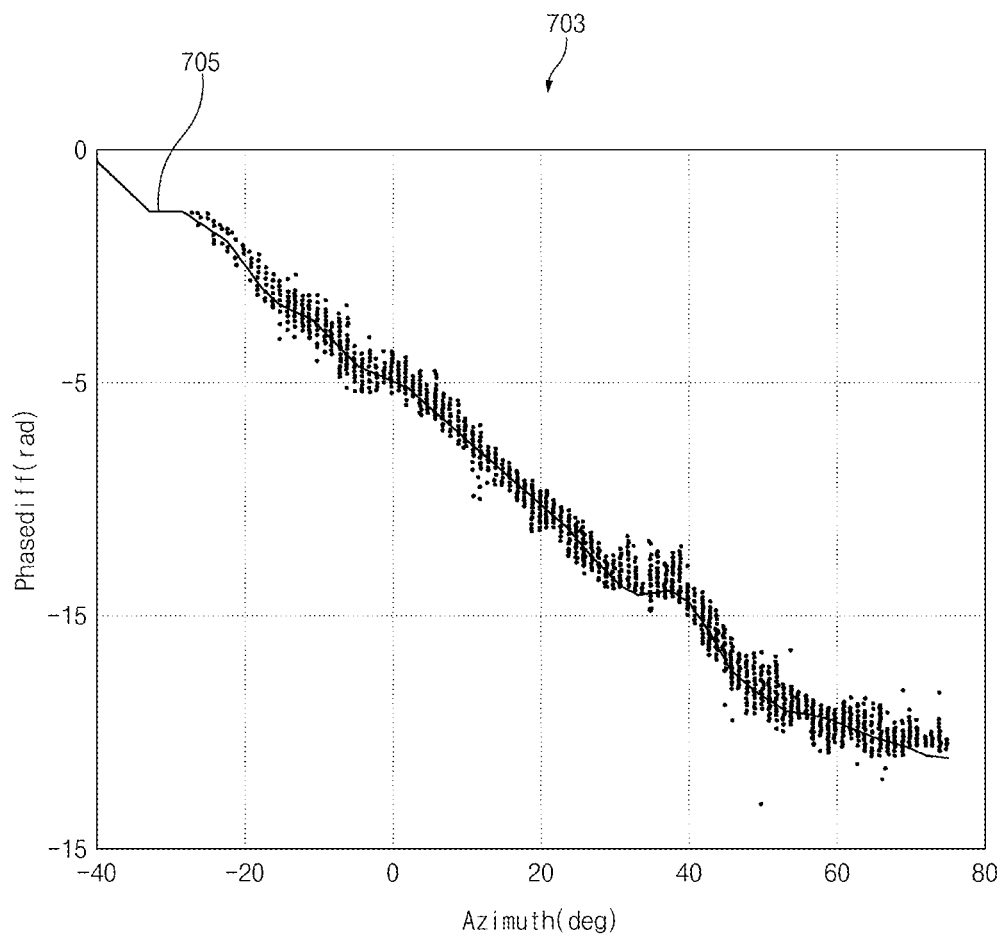

FIGS. 5 to 7 are views illustrating an operation of updating a phase curve based on a relative speed according to various embodiments.

Referring to FIG. 5, an object 520 may be a stationary object. While the vehicle 10 is driving, the vehicle control system 300 may use the ratio $V_r/V_h$ of the relative speed V r of the object 520 to the speed $V_h$ of the vehicle 10 to calculate the angle $\theta_{vehicle}$ expressed as following Equation 2 between the vehicle 10 and the object 520, where the calculated angle may be expressed in an acos function as shown in a first graph 601 of FIG. 6.

$$\theta_{vehicle} = \cos^{-1}\left(\frac{v_r}{v_h}\right) \quad \text{[Equation 2]}$$

As shown in a second graph 602 of FIG. 6, the vehicle control system 300 may calculate the angular coordinates based on the vehicle 10 and the angular coordinates based on the rear sensor 110-2, and may input the phase difference obtained through the input signal at each calculated angle. When data on the angle and phase difference as above are accumulated in a specified angle range (e.g., −90 degrees to 90 degrees), a phase curve 705 representing the relationship between the angle and the phase difference may be generated as shown in a third graph 703 of FIG. 7.

FIGS. 5 to 7 illustrate an embodiment in which a phase curve is generated by using the relative speed between the travelling vehicle 10 and the stationary object 520, but according to another embodiment, the vehicle control system 300 may obtain the moving speed of a vehicle moving in the rear of the vehicle through vehicle-to-vehicle communication, and may generate a phase curve by using the speed ratio between the vehicle 10 and the vehicle moving in the rear.

Figure 8:
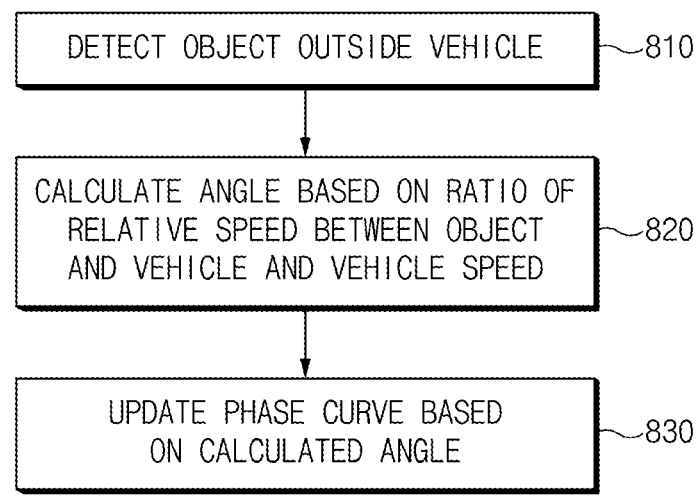
FIG. 8 is a flowchart illustrating an operation of calculating an angle between an object and a vehicle based on a relative speed according to various embodiments.

FIG. 8 is a flowchart illustrating an operation of calculating an angle between an object and a vehicle based on a relative speed according to various embodiments. The operations illustrated in FIGS. 8 to 10 below may be implemented by the vehicle control system 300 or may be implemented by some configuration (e.g., the controller 320) of the vehicle control system 300.

Referring to FIG. 8, in operation 810, the vehicle control system 300 may detect an object outside the vehicle 10. According to an embodiment, when the speed of the vehicle 10 is greater than or equal to a threshold speed (e.g., 30 km/h) and the angular velocity of the vehicle 10 is less than a threshold angular velocity (e.g., yaw rate<5), the vehicle control system 300 may perform an operation of detecting an external object.

In operation 820, the vehicle control system 300 may calculate an angle between the vehicle 10 and the object based on the ratio of the relative speed between the object and the vehicle 10 and the speed of the vehicle 10.

In operation 830, the vehicle control system 300 may update the phase curve in which the phase distortion of an input signal is reflected based on the calculated angle.

Figure 9:
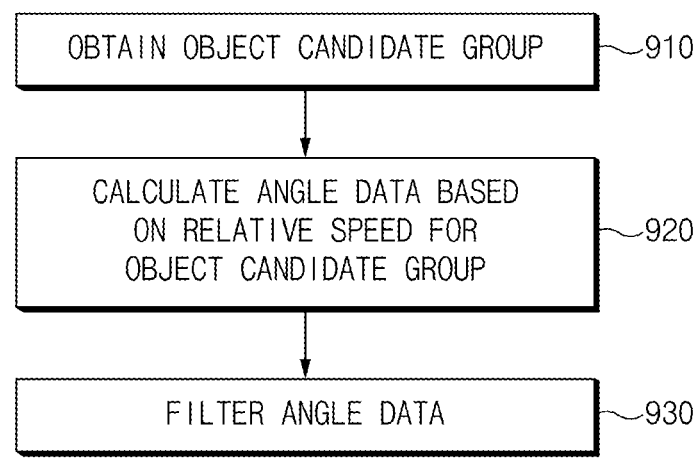
FIG. 9 is a flowchart illustrating an operation of collecting angle data according to various embodiments.

FIG. 9 is a flowchart illustrating an operation of collecting angle data according to various embodiments. For example, the operations illustrated in FIG. 9 may be operations that implement operation 820 of FIG. 8 in more detail.

Referring to FIG. 9, in operation 910, the vehicle control system 300 may obtain a candidate group for an object satisfying at least one of the following conditions in order to increase the accuracy of angle data for correcting the phase distortion:
1) Distance between an object and a vehicle is less than or equal to a threshold distance (e.g., 60 m).
2) Cosine value of the input signal is less than a threshold value (e.g., 0.15) (i.e., stationary object).
3) Threshold power of the input signal is greater than or equal to threshold power (e.g., 87 dB).
4) Ratio ($v_r/v_h$) of relative speed and speed is less than or equal to a first threshold value (e.g., 1).

In operation 920, the vehicle control system 300 may calculate angle data based on the ratio of a relative speed to a speed for each of the obtained object candidate groups.

In operation 930, the vehicle control system 300 may filter the angle data in order to increase the accuracy of the angle data. For example, the vehicle control system 300 may obtain the angle data satisfying at least one of the following conditions.
1) Within a threshold angle range (e.g., −90 degrees to 90 degrees).
2) Ratio ($v_r/v_h$) of a relative speed and a speed (e.g., 0.997) is less than or equal to a second threshold value (e.g., 0.997) less than the first threshold value.
3) The angle difference from the angle calculated through detection is less than a threshold angle (e.g., 3 degrees).
4) The phase difference from a reference phase curve (e.g., phase curve measured by SPC) is less than a first threshold difference (e.g. 0.5 rad or 0.8 rad).

Figure 10:
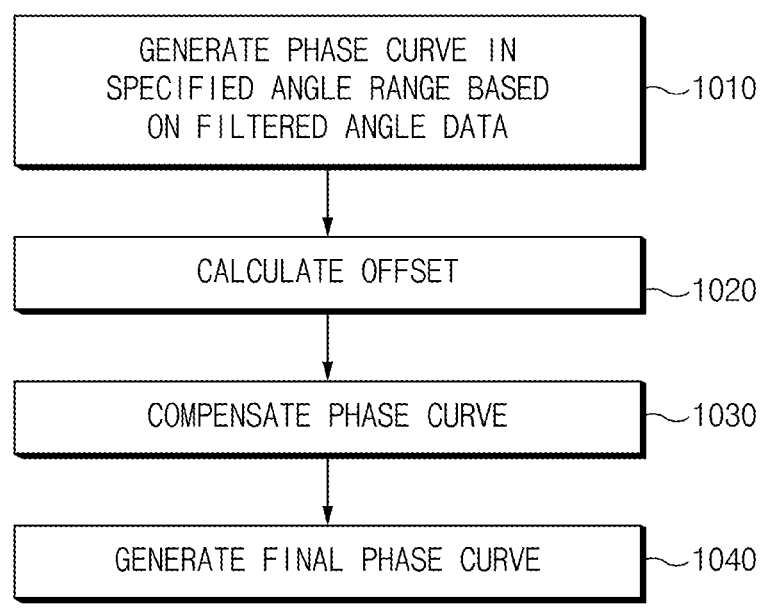
FIG. 10 is a flowchart illustrating an operation for updating a phase curve in accordance with various embodiments.

FIG. 10 is a flowchart illustrating an operation for updating a phase curve in accordance with various embodiments.

For example, the operations illustrated in FIG. 10 may be operations that implement operation 830 of FIG. 8 in more detail.

Referring to FIG. 10, in operation 1010, the vehicle control system 300 may generate a phase curve within a specified angle range based on the filtered angle data. For example, the vehicle control system 300 may generate a phase curve when information on the phase difference for each angle is accumulated within an angle range of −40 degrees to 80 degrees (or −40 degrees to 40 degrees) as shown in FIG. 7.

In operation 1020, the vehicle control system 300 may calculate an offset of the generated phase curve. For example, the vehicle control system 300 may calculate an offset at which an error from the reference phase curve is minimized for each channel (e.g., −40 degrees to 40 degrees).

In operation 1030, the vehicle control system 300 may compensate the phase curve. For example, because data may be insufficient in a specific angular range due to the lack of a stationary object, the vehicle control system 300 may replace data in the corresponding angle range with data of the reference phase curve.

In operation 1040, the vehicle control system 300 may generate a final phase curve in which the phase distortion is reflected by using the compensated phase curve and smoothing.

Figure 11:
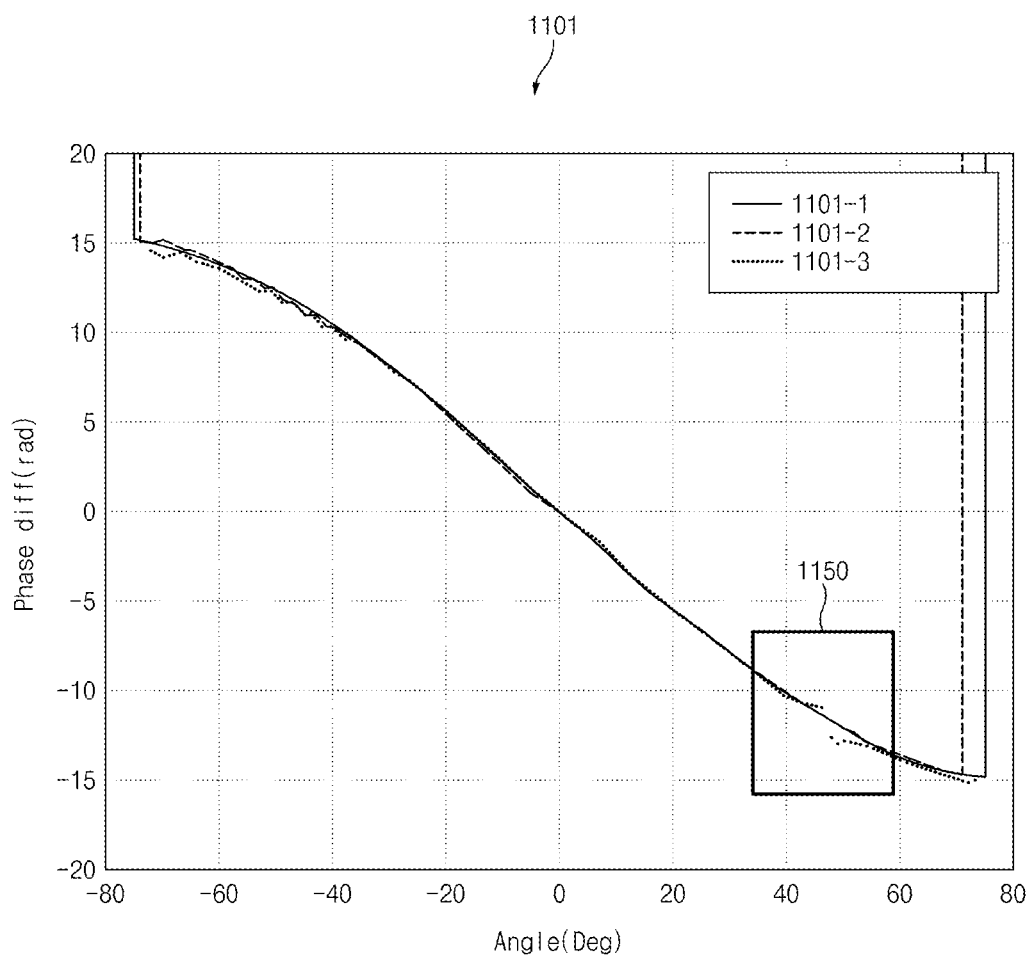
FIG. 11 is a graph illustrating a phase curve in which a speed error is reflected according to various embodiments.

FIG. 11 is a graph illustrating a phase curve in which a speed error is reflected according to various embodiments.

Referring to FIG. 11, when a phase curve 1101-3 is generated using the ratio of the relative speed and the speed, although the phase distortion due to the bumper may be reflected, due to various causes, the performance may deteriorate compared to the phase curve 1101-1 measured by SPC in a specific angle range (e.g., 1150) and a phase curve 1101-2 measured by IPC. For example, in the case where the degree of phase distortion caused by the bumper is severe (e.g., the angle error is more than 3 degrees) so that the phase curve does not show a monotonic decrease (i.e., angle ambiguity occurs), the object is located at the rear of the vehicle 10 (i.e., the angle is 0 degrees) so that it is difficult to accurately calculate the arc cosine value, a decrease in accuracy of a sensor (e.g., a wheel speed sensor) measuring the speed of the vehicle 10 or a time delay between sensors occurs, angle ambiguity occurs for objects located at the same angle left and right due to the symmetry of the cosine function, or the accumulated data is insufficient due to insufficient objects stationary in a specific angle range (e.g., to 60 degrees), the accuracy of phase curve correction using the ratio of relative speed and the speed may decrease.

The vehicle control system 300 according to embodiments may improve the accuracy of correction by replacing the data for the phase curve with the data of the reference phase curve in the range in which the performance is deteriorated.

Figure 12:
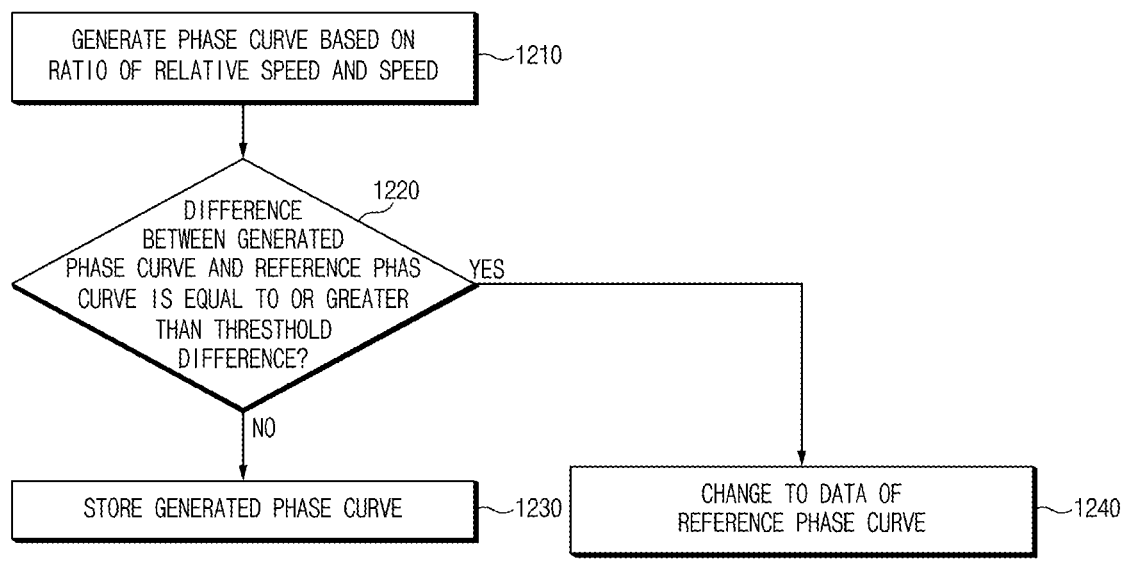
FIG. 12 is a flowchart illustrating an operation of replacing at least a part of a phase curve according to various embodiments.

FIG. 12 is a flowchart illustrating an operation of replacing at least a part of a phase curve according to various embodiments.

Referring to FIG. 12, in operation 1210, the vehicle control system 300 may generate a phase curve based on a ratio of a relative speed and a speed.

In operation 1220, the vehicle control system 300 may compare the generated phase curve with the reference phase curve, and may determine whether the phase difference between them is equal to or greater than a threshold difference (e.g., 0.2 rad). In an embodiment, the vehicle control system 300 may perform an operation for each specified angle range. When the phase difference is less than the threshold difference, the vehicle control system 300 may store the generated phase curve in operation 1230. When the phase difference is equal to or greater than the threshold difference, in operation 1240, the vehicle control system 300 may change the data in the corresponding range to data in the reference phase curve.

According to the embodiments disclosed in the present disclosure, the vehicle control system may generate a phase curve reflecting the bumper distortion feature unique to each vehicle, thereby improve angle accuracy and more accurately detect objects around the vehicle.

According to the embodiments disclosed in the present disclosure, the vehicle control system may improve the angle performance even through simple implementation, thereby reducing the cost and time required for vehicle production.

In addition, various effects that are directly or indirectly understood through the present disclosure may be provided.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:
1. A vehicle control system comprising:
a controller configured to:
detect an object outside a vehicle;
calculate an angle based on a ratio of a relative speed between the object and the vehicle to a speed of the vehicle; and update a phase curve reflecting a phase distortion of an input signal based on the calculated angle, wherein the controller is further configured to:

in order to calculate the angle, obtain an object candidate group based on at least one of whether a distance between the object and the vehicle is less than or equal to a threshold distance, whether a cosine value of the input signal is less than a threshold value, or whether the ratio of the relative speed to the speed of the vehicle is equal to or less than a threshold value;

calculate angle data based on the ratio of the relative speed to the speed of the vehicle with respect to the object candidate group; and filter the angle data.

2. The vehicle control system of claim 1, wherein the controller is further configured to:

detect the object when the speed of the vehicle is greater than or equal to a threshold speed and an angular speed of the vehicle is less than a threshold angular speed.

3. The vehicle control system of claim 1, wherein the controller is further configured to:

filter the angle data based on at least one of whether the angle data is within a threshold angle range, whether a ratio of a relative speed to a speed of the vehicle corresponding to each of the angle data is less than or equal to a second threshold value, which is less than the first threshold value, whether a difference between an angle determined based on the input signal and an angle determined based on the angle data is less than a threshold angle, or whether a difference between a phase difference corresponding to each of the angle data and a phase difference corresponding to a reference phase curve is less than a first threshold difference.

4. The vehicle control system of claim 1, wherein the controller is further configured to:

in order to update the phase curve, generate a phase curve within a specified angle range based on the filtered angle data;

calculate an offset of the generated phase curve;

compensate the phase curve of which the offset is calculated; and generate a final phase curve through the compensated phase curve and smoothing.

5. The vehicle control system of claim 1, wherein the controller is further configured to:

compare the updated phase curve with a reference phase curve, store the updated phase curve when a phase difference between the updated phase curve and the reference phase curve is less than a second threshold difference; and change the updated phase curve to the reference phase curve when the phase difference between the updated phase curve and the reference phase curve is equal to or greater than the second threshold difference.

6. The vehicle control system of claim 1, further comprising:

a signal processor configured to transmit or receive the input signal.

7. The vehicle control system of claim 1, further comprising:

a signal processor including a radar device configured to transmit or receive a signal in a specified frequency band.

8. A method of operating a vehicle control system, the method comprising:

detecting an object outside a vehicle;

calculating an angle based on a ratio of a relative speed between the object and the vehicle to a speed of the vehicle; and updating a phase curve reflecting a phase distortion of an input signal based on the calculated angle, wherein the calculating of the angle includes:

obtaining an object candidate group based on at least one of whether a distance between the object and the vehicle is less than or equal to a threshold distance, whether a cosine value of the input signal is less than a threshold value, whether a power of the input signal is greater than or equal to a threshold power, or whether a ratio of the relative speed to the speed of the vehicle is equal to or less than a threshold value;

calculating angle data based on the ratio of the relative speed to the speed of the vehicle with respect to the object candidate group; and filtering the angle data.

9. The method of claim 8, wherein the detecting of the object includes:

detecting the object when the speed of the vehicle is greater than or equal to a threshold speed and an angular speed of the vehicle is less than a threshold angular speed.

10. The method of claim 8, wherein the filtering of the angle data includes:

filtering the angle data based on at least one of whether the angle data is within a threshold angle range, whether a ratio of a relative speed to a speed of the vehicle corresponding to each of the angle data is less than or equal to a second threshold value, which is less than the first threshold value, whether a difference between an angle determined based on the input signal and an angle determined based on the angle data is less than a threshold angle, or whether a difference between a phase difference corresponding to each of the angle data and a phase difference corresponding to a reference phase curve is less than a first threshold difference.

11. The method of claim 9, wherein the updating of the phase curve includes:

generating a phase curve within a specified angle range based on the filtered angle data;

calculating an offset of the generated phase curve;

compensating the phase curve of which the offset is calculated; and generating a final phase curve through the compensated phase curve and smoothing.

12. The method of claim 8, further comprising:

comparing the updated phase curve with a reference phase curve; and storing the updated phase curve when the phase difference between the updated phase curve and the reference phase curve is less than a second threshold difference, and changing the updated phase curve to the reference phase curve when the phase difference between the updated phase curve and the reference phase curve is equal to or greater than the second threshold difference.

* * * * *